(12) United States Patent
Hong et al.

(10) Patent No.: US 10,830,733 B2
(45) Date of Patent: Nov. 10, 2020

(54) METHOD FOR SCANNING MULTILAYER MATERIAL USING MAGNETISM AND APPARATUS USING THE SAME

(71) Applicant: ELECTRONICS AND TELECOMMUNICATIONS RESEARCH INSTITUTE, Daejeon (KR)

(72) Inventors: Hyo-Bong Hong, Daejeon (KR); Jae Chan Jeong, Daejeon (KR); Seung-Min Choi, Daejeon (KR); Chang-Beom Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 335 days.

(21) Appl. No.: 15/870,565

(22) Filed: Jan. 12, 2018

(65) Prior Publication Data

US 2018/0202973 A1    Jul. 19, 2018

(30) Foreign Application Priority Data

Jan. 18, 2017    (KR) .......................... 10-2017-0008517

(51) Int. Cl.
*G01N 27/72* (2006.01)
*G01N 33/02* (2006.01)
(Continued)

(52) U.S. Cl.
CPC ............ *G01N 27/902* (2013.01); *G01N 27/82* (2013.01); *G01N 27/9033* (2013.01)

(58) Field of Classification Search
CPC ........ G01N 27/72; G01N 27/82; G01N 27/90; G01N 27/902; G01N 33/53; G01R 33/02; G01R 33/10; G01R 33/1276; G01R 33/60
See application file for complete search history.

(56) References Cited

U.S. PATENT DOCUMENTS 5,436,448 A  * 7/1995 Hosaka .................. B82Y 10/00
                                                            250/307
8,071,027 B2  12/2011 Miethe et al.
(Continued)

FOREIGN PATENT DOCUMENTS

JP    2004-325266 A    11/2004
KR    20-0281248 Y1    7/2002
(Continued)

OTHER PUBLICATIONS

Hans-Joachim Krause et al., "Magnetic particle detection by frequency mixing for immunoassay applications," Journal of Magnetism and Magnetic Materials, 2007, pp. 436-444, Vo. 311, Elsevier B.V.
(Continued)

*Primary Examiner* — Neel D Shah

(57) ABSTRACT

Disclosed herein are a method and apparatus for scanning a multilayer material using magnetism. The apparatus for scanning a multilayer material includes at least one measurement head for exciting a mixed magnetic field on a multilayer specimen using at least one excitation solenoid coil and detecting detection signals from the multilayer specimen using a detection solenoid coil, a movement controller for moving any one of the at least one measurement head and a stage on which the multilayer specimen is placed in order to detect detection signals for all parts of the multilayer specimen, and a signal controller for generating two excitation signals having different frequencies in order to generate the mixed magnetic field and for generating a scanning result for the multilayer specimen by collecting the detection signals.

10 Claims, 8 Drawing Sheets

(51) Int. Cl.
  *G01N 33/10* (2006.01)
  *G01N 27/90* (2006.01)
  *G01N 27/82* (2006.01)

(56) References Cited

U.S. PATENT DOCUMENTS

| | | | |
|---|---|---|---|
| 9,714,990 B2 | 7/2017 | Hong et al. | |
| 2002/0130659 A1* | 9/2002 | Wincheski | G01N 27/9033 |
| | | | 324/235 |
| 2004/0155659 A1* | 8/2004 | Prado | G01R 33/3806 |
| | | | 324/322 |
| 2010/0194374 A1* | 8/2010 | Trumper | B82Y 35/00 |
| | | | 324/72 |
| 2012/0003659 A1 | 1/2012 | Yoo | |
| 2014/0266172 A1* | 9/2014 | Hong | G01R 33/0213 |
| | | | 324/228 |
| 2014/0292336 A1 | 10/2014 | Hong | |
| 2015/0091556 A1 | 4/2015 | Hong et al. | |
| 2015/0300989 A1* | 10/2015 | Masleid | G01N 27/82 |
| | | | 324/207.17 |
| 2015/0311728 A1 | 10/2015 | Yun et al. | |
| 2016/0124062 A1* | 5/2016 | Taicher | G01N 24/08 |
| | | | 324/309 |

FOREIGN PATENT DOCUMENTS

| | | |
|---|---|---|
| KR | 20050010590 A | 1/2005 |
| KR | 10-2010-0101526 A | 9/2010 |
| KR | 10-2014-0113385 A | 9/2014 |
| KR | 20140119570 A | 10/2014 |

OTHER PUBLICATIONS

Chang-Beom Kim et al., "Magnetic immunoassay platform based on the planar frequency mixing magnetic technique," Biosensors and Bioelectronics, 2016, pp. 293-299, Vo.83, Elsevier B.V.

Hyobong Hong et al., "Magnetic particle imaging with a planar frequency mixing magnetic detection scanner," Review of Scientific Instruments, 2014, pp. 013705-1-013705-5, vol. 85, AIP Publishing.

* cited by examiner

METHOD FOR SCANNING MULTILAYER MATERIAL USING MAGNETISM AND APPARATUS USING THE SAME

CROSS REFERENCE TO RELATED APPLICATION

This application claims the benefit of Korean Patent Application No. 10-2017-0008517, filed Jan. 18, 2017, which is hereby incorporated by reference in its entirety into this application.

BACKGROUND OF THE INVENTION

1. Technical Field

The present invention relates to a method and apparatus for scanning a multilayer material using magnetism, in which, without using radiation or ultrasound, a material formed by layering different materials may be scanned using only magnetism and the result of scanning may be imaged and provided.

2. Description of the Related Art

Methods for enabling a material to have special properties by layering different metallic materials or nonferrous metallic materials are commonly used in various fields, such as those of electronic industries, material industries, and the like. For example, a Giant Magneto-Resistive (GMR) sensor, which is used for computer hard disks, biochips, Micro-Electro-Mechanical Systems (MEMS), and the like, is produced by uniting the layers of a ferromagnetic thin film and a nonmagnetic thin film. Also, Thin-Film Transistors (TFT) of an LCD or touch panels secure necessary properties using multilayered thin films.

In order to layer multiple thin films, various techniques are used. When layering a metallic plate and another metallic plate, a nonferrous metallic plate and a metallic plate, or a nonferrous metallic plate and another nonferrous metallic plate, welding is most commonly used. In the semiconductor industry, the method of depositing necessary materials is used.

However, a frequently encountered problem in industries in which multilayered thin films are used is that it is difficult to check whether materials to be united are uniformly bonded through welding or depositing. Checking whether the materials to be united are uniformly bonded is the most important process for solving abnormal junctions, which may be directly associated with decreased yield in various industries.

In the current semiconductor industry and the like, analysis devices based on a Transmission Electron Microscope (TEM) or X-rays are widely used. Here, when the size of a specimen is greater than the size of a semiconductor, the specimen is dismantled and then analyzed, or nondestructive analysis using X-rays is performed. However, when a nondestructive analysis method using radioactivity is used, it is difficult to handle radiation such as X-rays. Furthermore, in the case of a battery or a specimen having chemical functionality, it is difficult to apply the nondestructive analysis method thereto. In this regard, Korean Patent Application Publication No. 10-2010-0101526 (published on Sep. 17, 2010) discloses a technology related to "Strobo thin film chemical analysis apparatus and assay method using the same."

SUMMARY OF THE INVENTION

An object of the present invention is to provide a scanning method through which a battery or a multilayer specimen having chemical functionality, which are difficult to analyze using a nondestructive analysis method using radioactivity, such as X-rays or the like, may be analyzed.

Another object of the present invention is to provide a scanning apparatus through which a multilayer specimen may be analyzed regardless of the size thereof.

A further object of the present invention is to provide a method for analyzing a multilayer specimen that is formed by bonding the same kind of pieces of metal using the same kind of material.

Yet another object of the present invention is to provide a method through which material may be analyzed without using an expensive electron microscope and without causing physical damage to the junction of a multilayered thin film structure.

Still another object of the present invention is to provide a method through which a material may be scanned without using radiation or ultrasound and through which the scanning result may be imaged.

In order to accomplish the above objects, an apparatus for scanning a multilayer material according to the present invention includes at least one measurement head for exciting a mixed magnetic field on a multilayer specimen using at least one excitation solenoid coil and detecting detection signals from the multilayer specimen using a detection solenoid coil; a movement controller for moving any one of the at least one measurement head and a stage on which the multilayer specimen is placed in order to detect the detection signals for all parts of the multilayer specimen; and a signal controller for generating two excitation signals having different frequencies in order to generate the mixed magnetic field and for generating a scanning result for the multilayer specimen by collecting the detection signals.

Here, the at least one measurement head may be configured with any one of a single-sided measurement head, which operates on one side of the multilayer specimen, and double-sided measurement heads, which operate on opposite sides of the multilayer specimen.

Here, the at least one measurement head may excite the mixed magnetic field using any one of a method in which the mixed magnetic field is directly generated using a single excitation solenoid coil and a method in which the mixed magnetic field is generated by mixing two magnetic fields respectively generated using two excitation solenoid coils.

Here, when the at least one measurement head excites the mixed magnetic field using the method in which the mixed magnetic field is generated using the single excitation solenoid coil, the signal controller may deliver a mixed signal, which is formed by adding the two excitation signals, to the at least one measurement head.

Here, the movement controller may include a measurement head controller for moving the at least one measurement head to all coordinates of the multilayer specimen based on an X-axis and a Y-axis; and a stage controller for moving the stage such that a location of the at least one measurement head matches all coordinates of the multilayer specimen.

Here, the signal controller may include a result generation unit for generating the scanning result based on a frequency range of the detection signal; and an image output unit for imaging and outputting the scanning result.

Here, the two excitation signals may correspond to a single high-frequency signal and a single low-frequency signal.

Here, the mixed magnetic field may be a combination of a first magnetic field generated by the high-frequency signal and a second magnetic field generated by the low-frequency signal.

Here, the signal controller may generate the mixed signal using any one of a combiner, in which two signals are combined by being added, and an adder circuit using an operational amplifier.

Also, a method for scanning a multilayer material using magnetism, in which an apparatus for scanning a multilayer material is used, according to an embodiment of the present invention includes generating, by a signal controller, two excitation signals having different frequencies; generating, by at least one measurement head, a mixed magnetic field based on the two excitation signals; exciting, by a movement controller, the mixed magnetic field at all locations of a multilayer specimen by moving any one of the at least one measurement head and the multilayer specimen; and detecting, by the signal controller, detection signals from the multilayer specimen and thereby generating a scanning result for the multilayer specimen.

Here, the at least one measurement head may be configured with any one of a single-sided measurement head, which operates on one side of the multilayer specimen, and double-sided measurement heads, which operate on opposite sides of the multilayer specimen.

Here, generating the mixed magnetic field may include directly generating the mixed magnetic field using a single excitation solenoid coil included in the at least one measurement head; and generating the mixed magnetic field by mixing two magnetic fields respectively generated using two excitation solenoid coils included in the at least one measurement head.

Here, generating the two excitation signals may include generating a mixed signal by adding the two excitation signals in order to generate the mixed magnetic field based on the single excitation solenoid coil.

Here, exciting the mixed magnetic field may include moving the at least one measurement head to all coordinates of the multilayer specimen based on an X-axis and a Y-axis; and moving a stage on which the multilayer specimen is placed such that a location of the at least one measurement head matches all coordinates of the multilayer specimen.

Here, generating the scanning result may be configured to generate the scanning result based on a frequency range of the detection signal and to image and output the scanning result.

Here, the two excitation signals may correspond to a single high-frequency signal and a single low-frequency signal.

Here, the mixed magnetic field may be a combination of a first magnetic field generated by the high-frequency signal and a second magnetic field generated by the low-frequency signal.

Here, generating the mixed signal may be configured to generate the mixed signal using any one of a combiner, in which two signals are combined by being added, and an adder circuit using an operational amplifier.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
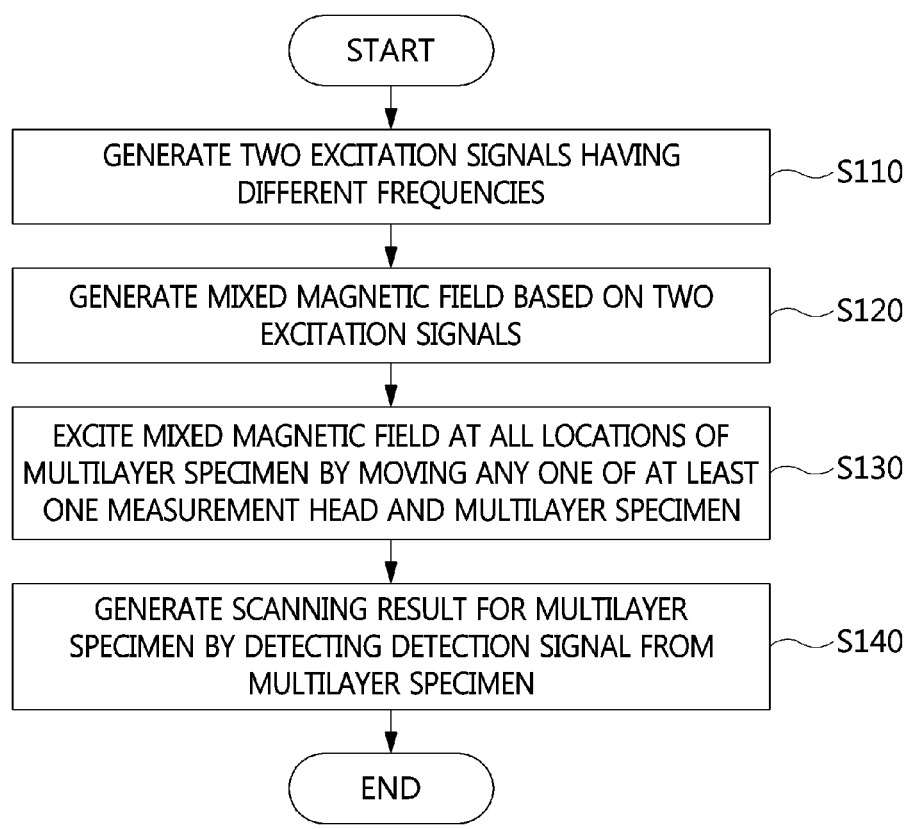
FIG. 1 is a flowchart that shows a method for scanning a multilayer material using magnetism according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a flowchart that shows a method for scanning a multilayer material using magnetism according to an embodiment of the present invention.

Referring to FIG. 1, in the method for scanning a multilayer material using magnetism according to an embodiment of the present invention, the signal controller of an apparatus for scanning a multilayer material generates two excitation signals having different frequencies at step S110.

Here, the frequencies of the two excitation signals may be set depending on the kind of multilayer specimen to be scanned. For example, the two excitation signals may be generated by setting two different frequencies within the range from 1 kHz to 100 kHz.

Here, the multilayer specimen may include metallic materials or nonferrous metallic materials, and materials having multilayered thin film structures may have different magnetic properties.

Here, in order to generate a mixed magnetic field based on a single excitation solenoid coil, a mixed signal may be generated by adding the two excitation signals. Accordingly, the mixed signal may include the characteristics of the two frequencies.

Here, the mixed signal may be generated using any one of a combiner, in which two signals are combined by being added, and an adder circuit using an operational amplifier.

For example, a single mixed signal may be generated by adding two signals having different frequencies using a power divider/combiner.

Here, the two excitation signals may correspond to a high-frequency signal and a low-frequency signal. For example, a high-frequency signal generation module, which is capable of generating a high-frequency signal, and a low-frequency signal generation module, which is capable of generating a low-frequency signal, are arranged, and the respective signal generation modules may generate a high-frequency signal and a low frequency signal in response to a control command given to scanning software. Here, power may be supplied from a separate power source to the high-frequency signal generation module and the low-frequency signal generation module.

Also, in the method for scanning a multilayer material using magnetism according to an embodiment of the present invention, at least one measurement head of the apparatus for scanning a multilayer material generates a mixed magnetic field based on the two excitation signals at step S120.

Here, the at least one measurement head may be configured with any one of a single-sided measurement head, which operates on one side of the multilayer specimen, and double-side measurement heads, which operate on opposites sides of the multilayer specimen.

Here, when scanning is performed using a single-sided measurement head, it is disadvantageous in that the sensitivity with which a detection signal is measured is lower than when double-sided measurement heads are used. However, the single-sided measurement head may more easily scan a large or thick specimen by moving itself.

Accordingly, in order to improve the sensitivity with which a detection signal is measured, double-sided measurement heads, which measure the detection signals on opposite sides of the specimen, are used. However, when a specimen is too large to be placed between double-sided measurement heads, a single-sided measurement head may be used.

Here, a mixed magnetic field may be directly generated using a single excitation solenoid coil included in the at least one measurement head.

For example, the single excitation solenoid coil may generate a mixed magnetic field by directly receiving a mixed signal in which a high-frequency excitation signal and a low-frequency excitation signal are added. That is, the mixed magnetic field may be identical to a combination of magnetic fields generated respectively from the high-frequency excitation signal and the low-frequency excitation signal included in the mixed signal.

Also, the mixed magnetic field may be generated by mixing two magnetic fields respectively generated using two excitation solenoid coils included in the at least one measurement head.

For example, a high-frequency excitation signal may be applied to one excitation solenoid coil, and a low-frequency excitation signal may be applied to the other excitation solenoid coil, among the two excitation solenoid coils.

Here, the mixed magnetic field may be a combination of a first magnetic field generated by the high-frequency signal and a second magnetic field generated by the low-frequency signal.

Here, the single excitation solenoid coil or the two excitation solenoid coils may be coils that are capable of generating magnetism, the strength of which is sufficient to magnetize metallic or nonferrous metallic materials.

For example, the single excitation solenoid coil or the two excitation solenoid coils may be configured with 1000 to 2000 turns of thin enameled wire.

Also, in the method for scanning a multilayer material using magnetism according to an embodiment of the present invention, the movement controller of the apparatus for scanning a multilayer material moves any one of the at least one measurement head and the multilayer specimen and thereby excites the mixed magnetic field at all locations of the multilayer specimen at step S130.

Here, the at least one measurement head may be moved to all coordinates of the multilayer specimen based on the X-axis and the Y-axis.

For example, in the state in which the multilayer specimen is fixed on the stage, the at least one measurement head may generate a mixed magnetic field while moving to all locations of the multilayer specimen.

Here, the stage on which the multilayer specimen is placed may be moved such that the location of the at least one measurement head matches all coordinates of the multilayer specimen.

For example, the at least one measurement head generates a mixed magnetic field at a fixed location, and the stage on which the multilayer specimen is placed is moved, whereby all parts of the multilayer specimen may be affected by the mixed magnetic field.

Also, in the method for scanning a multilayer material using magnetism according to an embodiment of the present invention, the signal controller of the apparatus for scanning a multilayer material generates a scanning result for the multilayer specimen at step S140 by detecting detection signals from the multilayer specimen.

Here, the detection signal may be detected using a detection solenoid coil included in the at least one measurement head. That is, the detection solenoid coil may detect the detection signal generated by the mixed magnetic field, which is generated by a single excitation solenoid coil or by two excitation solenoid coils.

Here, a scanning result may be generated based on the frequency range of the detection signal, and the scanning result may be imaged and output.

Here, the scanning result may be imaged in consideration of the detection signal and location information acquired as the result of moving at least one of the at least one measurement head and the stage on which the multilayer specimen is placed.

For example, the coordinates of the location of the at least one measurement head or the coordinates of the multilayer specimen depending on the movement of the stage, which corresponds to the location of the at least one measurement head, match the detection signal measured at the corresponding coordinates, whereby the scanning result may be generated and imaged.

Also, in the method for scanning a multilayer material using magnetism according to an embodiment of the present invention, various kinds of information generated during the above-described process of scanning a multilayer material according to an embodiment of the present invention may be stored.

As described above, using the method for scanning a multilayer material according to the present invention, a battery or a multilayer specimen having chemical functionality, which are difficult to analyze using a nondestructive analysis method using radioactivity, such as X-rays or the like, may be analyzed.

Also, a scanning apparatus through which a multilayer specimen may be analyzed regardless of the size thereof may be provided, whereby a multilayer specimen formed by bonding multiple pieces of the same kind of metal using the same kind of material may be analyzed.

Also, a material may be analyzed without using an expensive electron microscope and without causing physical damage to the junction of the thin-film structure of the material, and a method for scanning and imaging a material without using radiation or ultrasound may be provided.

Figure 2:
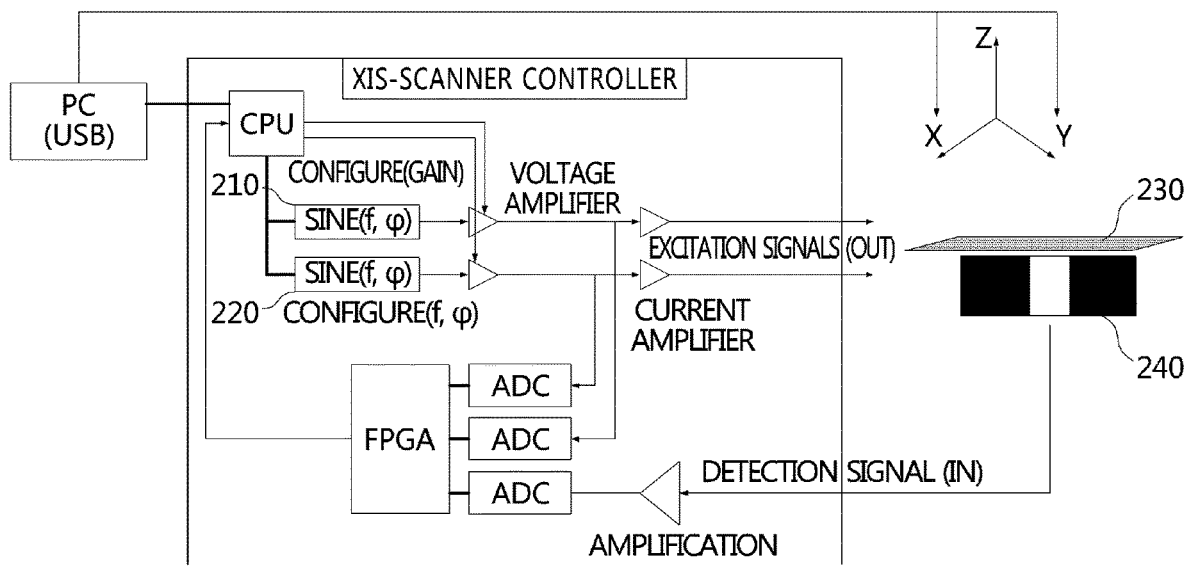
FIGS. 2 to 3 are views that show an example of the form of a measurement head according to the present invention.
Figure 3:
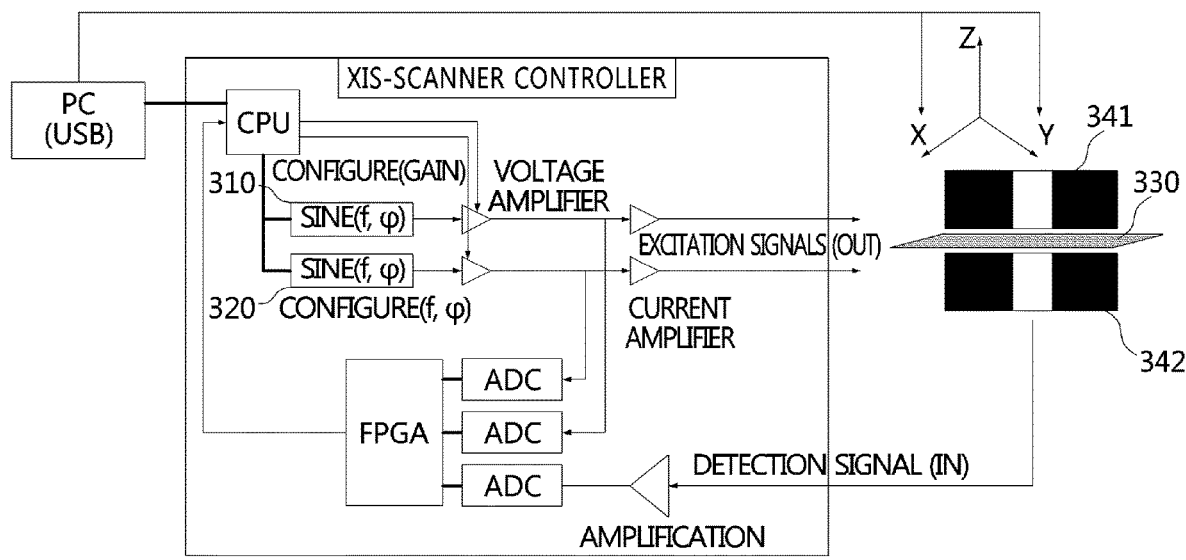

FIGS. 2 to 3 are views that show an example of the form of a measurement head according to the present invention.

Referring to FIG. 2 and FIG. 3, the present invention may use a single-sided measurement head 240, which operates on one side of the multilayer specimen 230 as shown in FIG. 2, or double-sided measurement heads 341 and 342, which operate on opposite sides of the multilayer specimen 330 as shown in FIG. 3.

First, the single-sided measurement head 240, illustrated in FIG. 2, may receive two excitation signals generated respectively from two signal generators 210 and 220.

For example, one signal generator 210 may generate a high-frequency excitation signal, and the other signal generator 220 may generate a low-frequency excitation signal.

Here, the mixture of the two excitation signals may be applied depending on the configuration of excitation solenoid coils included in the measurement head 240.

For example, when the measurement head 240 is configured with a single excitation solenoid coil, a mixed signal formed by adding the two excitation signals using a separate combiner or an adder circuit may be applied to the measurement head 240.

Alternatively, when the measurement head 240 is configured with two excitation solenoid coils, the two excitation signals may be applied to the respective excitation solenoid coils.

Here, as shown in FIG. 2, the single-sided measurement head 240 may generate a mixed magnetic field on one side of the multilayer specimen 230, and may detect a detection signal that is generated from the specimen under the influence of the mixed magnetic field.

Also, the double-sided measurement heads 341 and 342 illustrated in FIG. 3 may receive two excitation signals generated respectively from two signal generators 310 and 320.

For example, one signal generator 310 may generate a high-frequency excitation signal, and the other signal generator 320 may generate a low-frequency excitation signal.

Here, similar to the measurement head 240 in FIG. 2, the measurement heads 341 and 342 in FIG. 3 may receive the mixture of the two excitation signals depending on the configuration of excitation solenoid coils.

Here, as shown in FIG. 3, because the double-sided measurement heads 341 and 342 generate a mixed magnetic field on opposite sides of the multilayer specimen 330 and also detect detection signals on opposite sides thereof, the sensitivity with which the detection signals are measured may be better than when the single-sided measurement head illustrated in FIG. 2 is used.

However, because the double-sided measurement heads 341 and 342 shown in FIG. 3 are located such that the multilayer specimen 330 is placed therebetween, when the multilayer specimen 330 is large or thick, it is difficult to perform scanning using the double-sided measurement heads 341 and 342. Therefore, when a multilayer specimen is large or thick, the single-sided measurement head 240 illustrated in FIG. 2 is used, whereby scanning may be more easily performed.

Figure 4:
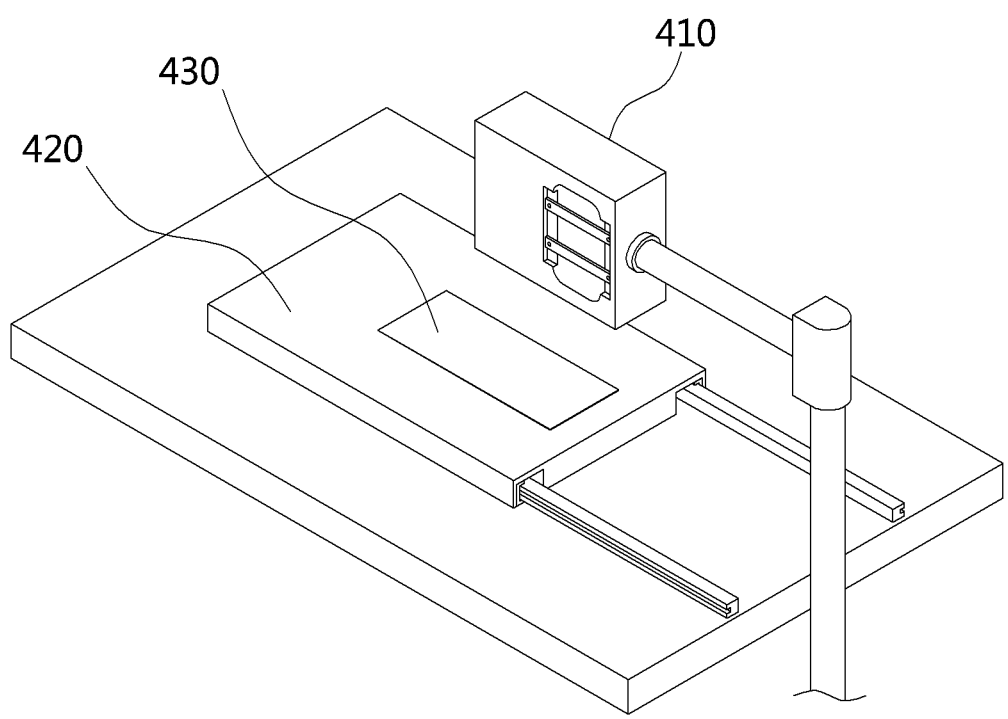
FIGS. 4 to 5 are views that show an example of a measurement head, a stage, and a specimen according to the present invention.
Figure 5:
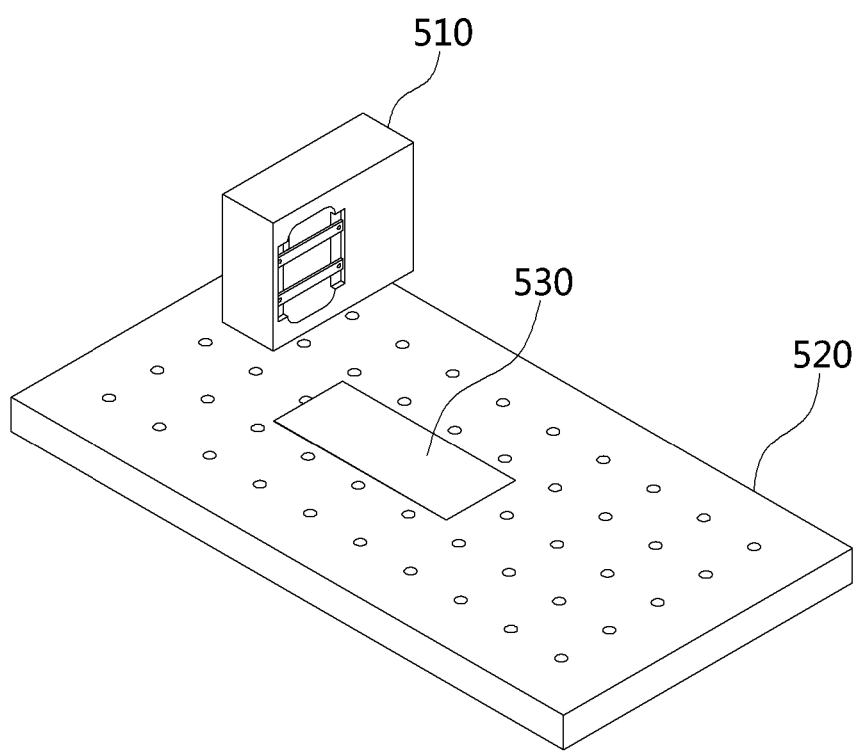

FIGS. 4 to 5 are views that show an example of a measurement head, a stage, and a specimen according to the present invention.

Referring to FIG. 4 and FIG. 5, the measurement head 410, 510 according to the present invention may generate a mixed magnetic field above the multilayer specimen 430, 530 placed on the stage 420, 520 and may detect detection signals that are generated from the multilayer specimen 430, 530 under the influence of the mixed magnetic field.

Here, in FIG. 4 and FIG. 5, a single-sided measurement head 410, 510 located on only one side of the multilayer specimen 430, 530 is illustrated. However, depending on the circumstances, another measurement head may be additionally arranged below the stage 420, 520 and scanning may be performed using the double-sided measurement heads.

Here, when the multilayer specimen 430, 530 is scanned, the measurement head 410, 510 may detect detection signals while moving around the multilayer specimen placed on the stage 420, 520.

Also, when the multilayer specimen 430, 530 is scanned, the measurement head 410, 510 fixed at a certain location may detect detection signals emitted from the multilayer specimen 430, 530 while the stage 420, 520 on which the multilayer specimen 430, 530 is placed is moving.

Here, the measurement head 410, 510 or the stage 420, 520 may move based on the X-axis and the Y-axis.

Figure 6:
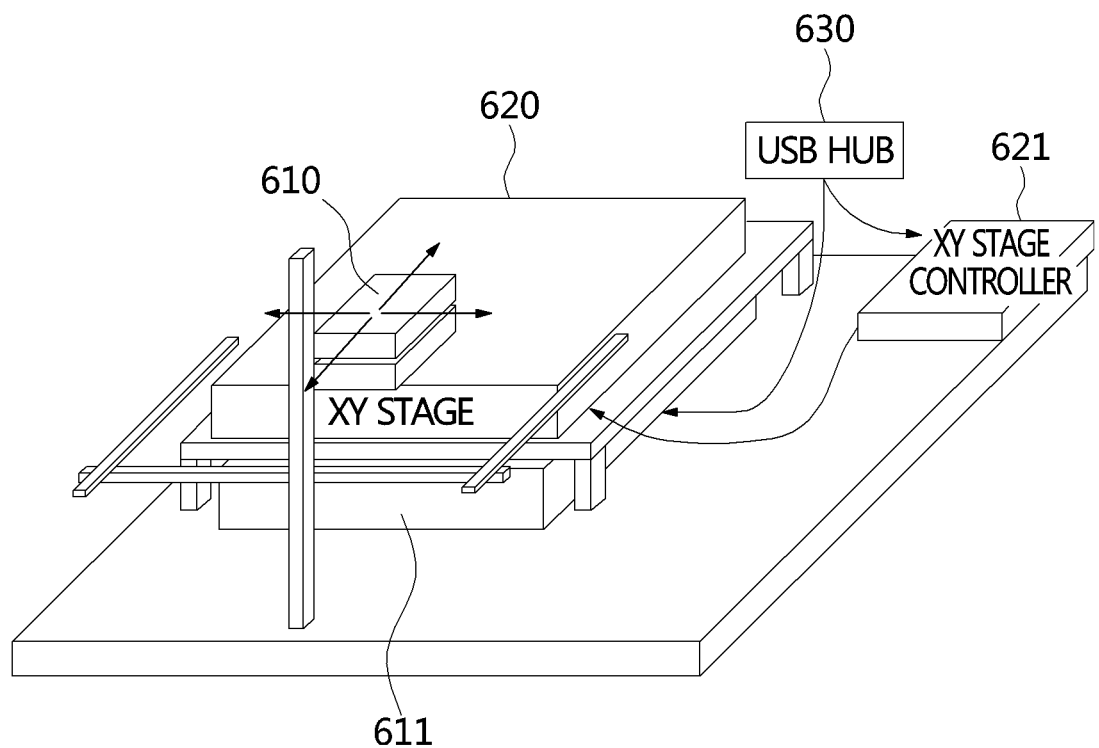
FIG. 6 is a view that shows an apparatus for scanning a multilayer material according to an embodiment of the present invention.

FIG. 6 is a view that shows an apparatus for scanning a multilayer material according to an embodiment of the present invention.

Referring to FIG. 6, an apparatus for scanning a multilayer material according to an embodiment of the present invention includes at least one measurement head 610, a movement controller, and a signal controller.

The at least one measurement head 610 excites a mixed magnetic field on a multilayer specimen through at least one excitation solenoid coil, and detects a detection signal from the multilayer specimen through a detection solenoid coil.

Here, the multilayer specimen may include metallic materials or nonferrous metallic materials, and materials having multilayered thin film structures may have different magnetic properties.

Here, the at least one measurement head 610 may be configured with any one of a single-sided measurement head, which operates on one side of the multilayer specimen, and double-side measurement heads, which operate on opposites sides of the multilayer specimen.

Here, when scanning is performed using a single-sided measurement head, it is disadvantageous in that the sensitivity with which a detection signal is measured is lower than when double-sided measurement heads are used. However, the single-sided measurement head may more easily scan a large or thick specimen by moving itself.

Accordingly, in order to improve the sensitivity with which a detection signal is measured, double-sided measurement heads, which measure the detection signals on opposite sides of the specimen, are used. However, when a specimen is too large to be placed between double-sided measurement heads, a single-sided measurement head may be used.

Here, the at least one measurement head 610 may excite a mixed magnetic field using any one of the method in which the mixed magnetic field is generated using a single excitation solenoid coil and the method in which the mixed magnetic field is generated by mixing two magnetic fields respectively generated using two excitation solenoid coils.

Here, the mixed magnetic field may be directly generated using a single excitation solenoid coil included in the at least one measurement head.

For example, the single excitation solenoid coil may generate the mixed magnetic field by directly receiving a mixed signal formed by adding a high-frequency excitation signal and a low-frequency excitation signal. That is, the mixed magnetic field may be identical to a combination of magnetic fields generated respectively from the high-frequency excitation signal and the low-frequency excitation signal included in the mixed signal.

Also, the mixed magnetic field may be generated by mixing two magnetic fields respectively generated using two excitation solenoid coils included in the at least one measurement head 610.

For example, a high-frequency excitation signal may be applied to one excitation solenoid coil, and a low-frequency excitation signal may be applied to the other excitation solenoid coil, among the two excitation solenoid coils.

Here, the single excitation solenoid coil or the two excitation solenoid coils may be coils that are capable of generating magnetism, the strength of which is sufficient to magnetize metallic or nonferrous metallic materials.

For example, the single excitation solenoid coil or the two excitation solenoid coils may be configured with 1000 to 2000 turns of thin enameled wire.

Here, a detection signal may be detected using a detection solenoid coil included in the at least one measurement head 610. That is, the detection solenoid coil may detect the detection signal generated by the mixed magnetic field, which is generated by the single excitation solenoid coil or by the two excitation solenoid coils.

The movement controller moves any one of the at least one measurement head and a stage 620 on which the multilayer specimen is placed in order to detect detection signals for all locations of the multilayer specimen.

For example, the controller 621 illustrated in FIG. 6 may be the movement controller.

Here, the movement controller may move the at least one measurement head 610 to all coordinates of the multilayer specimen based on the X-axis and the Y-axis.

For example, in the state in which the multilayer specimen is fixed on the stage 620, the at least one measurement head may generate a mixed magnetic field while moving to all locations of the multilayer specimen.

Here, the stage 620 on which the multilayer specimen is placed may be moved such that the location of the at least one measurement head matches all coordinates of the multilayer specimen.

For example, the at least one measurement head generates a mixed magnetic field at a fixed location, and the stage 620 on which the multilayer specimen is placed is moved, whereby all parts of the multilayer specimen may be affected by the mixed magnetic field.

The signal controller generates two excitation signals having different frequencies in order to generate a mixed magnetic field and generates a scanning result for the multilayer specimen by collecting detection signals. For example, the signal controller may be the signal controller 611 illustrated in FIG. 6.

Here, the frequencies of the two excitation signals may be set depending on the kind of multilayer specimen to be scanned. For example, the two excitation signals may be generated by setting two different frequencies within the range from 1 kHz to 100 kHz.

Here, the two excitation signals may be a high-frequency signal and a low-frequency signal. For example, a high-frequency signal generation module, which is capable of generating a high-frequency signal, and a low-frequency signal generation module, which is capable of generating a low-frequency signal, are arranged, and the respective signal generation modules may generate a high-frequency signal and a low frequency signal in response to a control command given to scanning software. Here, power may be supplied from a separate power source to the high-frequency signal generation module and the low-frequency signal generation module.

Accordingly, the mixed magnetic field may be a combination of a first magnetic field generated by the high-frequency signal and a second magnetic field generated by the low-frequency signal.

Here, when the at least one measurement head 610 intends to excite a mixed magnetic field using a single excitation solenoid coil, a mixed signal formed by adding the two excitation signals may be delivered to the at least one measurement head. Accordingly, the mixed signal may include the characteristics of the two frequencies.

Here, a scanning result may be generated based on the frequency range of the detection signal.

Here, the scanning result may be imaged and output.

Here, the scanning result may be imaged in consideration of the detection signal and location information acquired as the result of moving at least one of the at least one measurement head 610 and the stage 620 on which the multilayer specimen is placed.

For example, the coordinates of the location of the at least one measurement head 610 or the coordinates of the multilayer specimen depending on the movement of the stage 620, which corresponds to the location of the at least one measurement head 610, match the detection signal measured at the corresponding coordinates, whereby the scanning result may be generated and imaged.

Here, the mixed signal may be generated using any one of a combiner, in which two signals are combined by being added, and an adder circuit using an operational amplifier.

For example, a single mixed signal may be generated by adding two signals having different frequencies using a power divider/combiner.

Also, although not illustrated in FIG. 6, the apparatus for scanning a multilayer material according to the present invention may include a storage module for storing various kinds of information generated in the apparatus for scanning a multilayer material according to an embodiment of the present invention.

According to an embodiment, the storage module may support the function for scanning a multilayer material in a manner of being separate from the apparatus for scanning a multilayer material. Here, the storage module may function as separate mass storage, and may include a control function for performing operations.

Meanwhile, the apparatus for scanning a multilayer material may store information in memory installed therein. In an embodiment, the memory is a computer-readable recording medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard disk device, an optical disk device, or any other mass storage.

As described above, through the apparatus for scanning a multilayer material according to the present invention, there is provided a scanning method through which a battery or a multilayer specimen having chemical functionality, which are difficult to analyze using a nondestructive analysis method using radioactivity, such as X-rays or the like, may be analyzed.

Also, a scanning apparatus through which a multilayer specimen may be analyzed regardless of the size thereof may be provided, whereby a multilayer specimen formed by bonding multiple pieces of the same kind of metal using the same kind of material may be analyzed.

Also, a material may be analyzed without using an expensive electron microscope and without causing physical damage to the junction of the thin-film structure of the material, and a method for scanning and imaging a material without using radiation or ultrasound may be provided.

Figure 7:
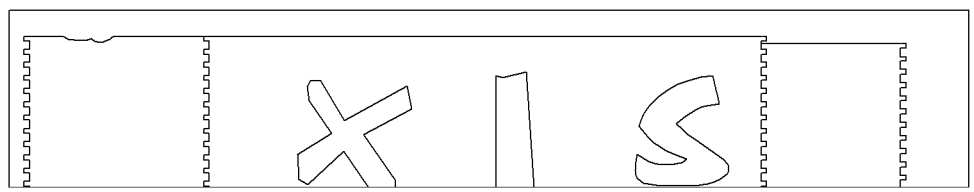
FIG. 7 is a view that shows an example of a multilayer specimen according to the present invention.

FIG. 7 is a view that shows an example of a multilayer specimen according to the present invention.

Referring to FIG. 7, the multilayer specimen according to the present invention may be a material generated by stacking materials having thin-film structures, as shown in FIG. 7.

Here, the multilayer specimen may include metal or nonferrous metal, and the stacked materials having thin-film structures may have different magnetic properties.

For example, in the multilayer specimen illustrated in FIG. 7, the thin film plate on the bottom may be a copper plate corresponding to a diamagnetic plate, among nonmetallic or nonferrous metallic materials, and the thin film plate stacked above may be an aluminum plate cut in the shape of letters 'XIS'.

Figure 8:
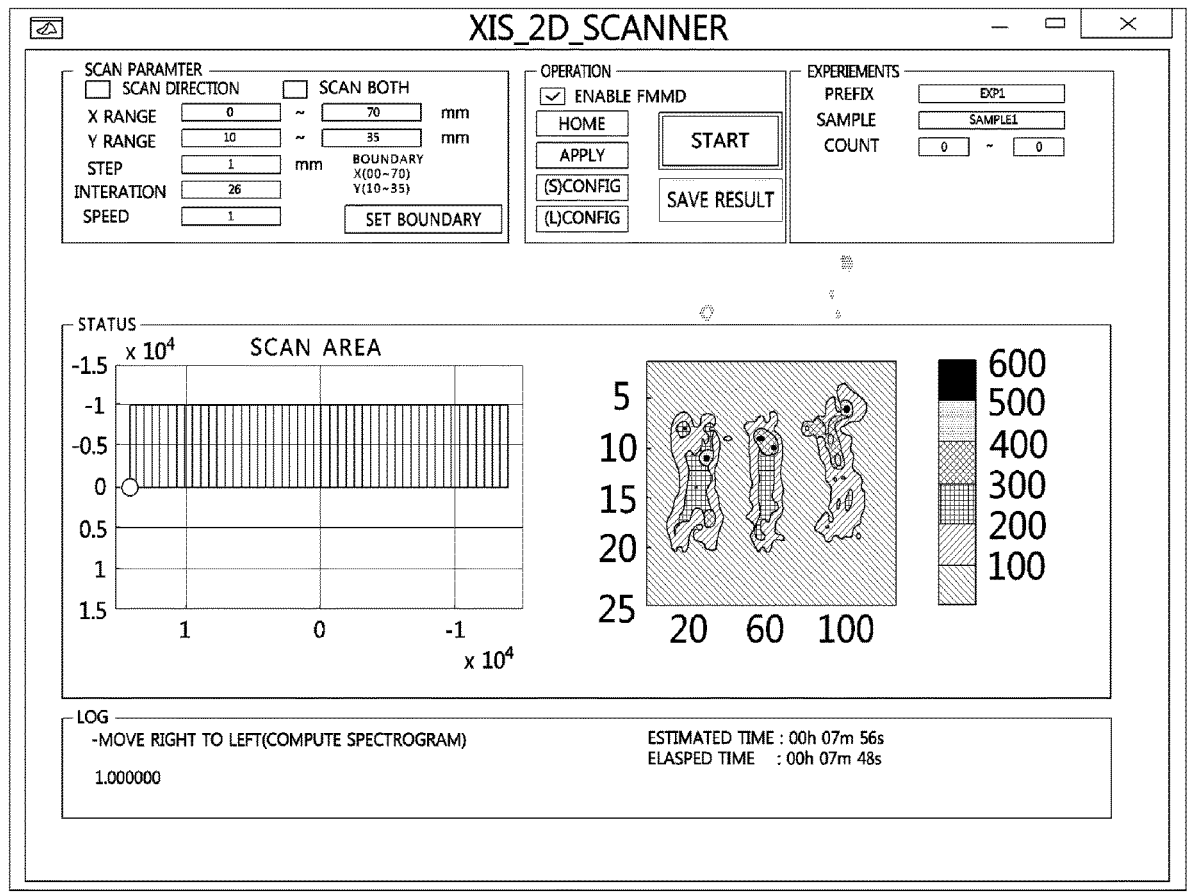
FIGS. 8 to 9 are views that show an example of the result of scanning the multilayer specimen illustrated in FIG. 7.
Figure 9:
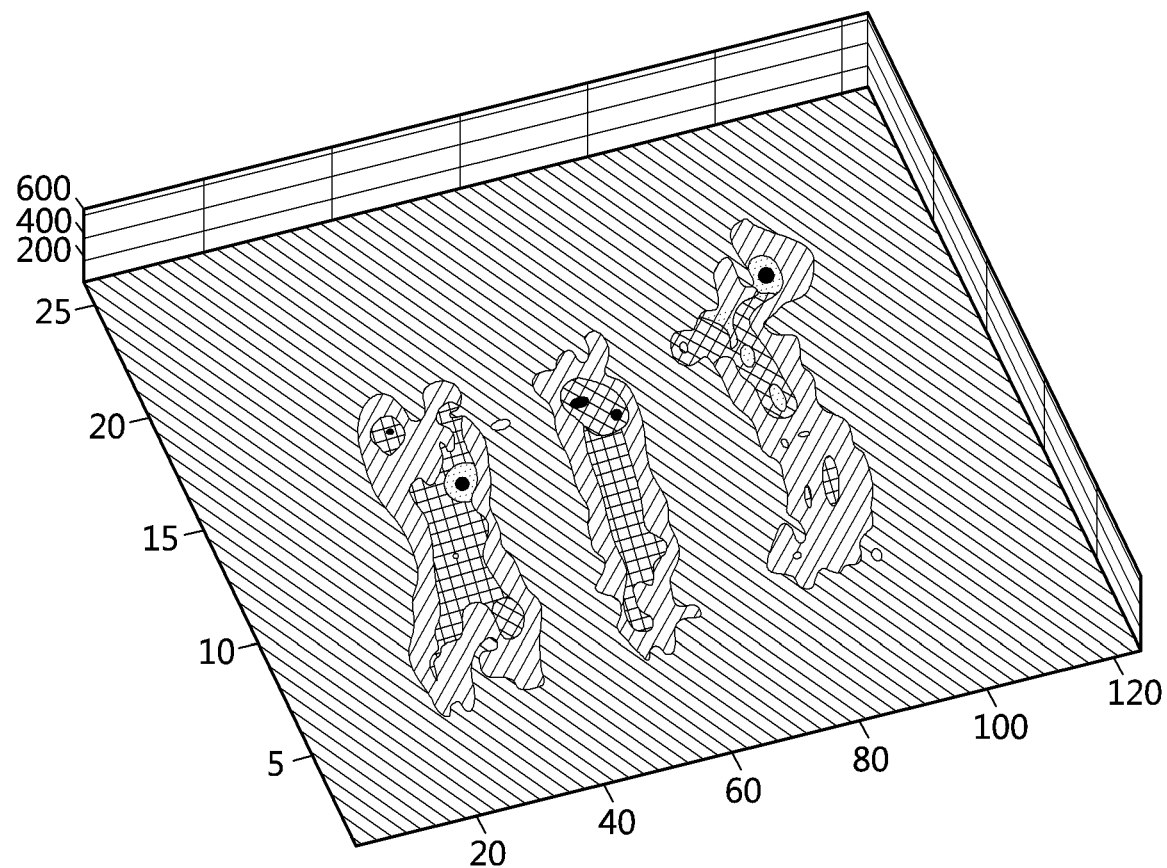

FIGS. 8 to 9 are views that show an example of the result of scanning the multilayer specimen illustrated in FIG. 7.

Referring to FIG. 8 and FIG. 9, the scanning result generated by scanning the multilayer specimen illustrated in FIG. 7 may be confirmed.

For example, detection signals are acquired by moving the stage on which the multilayer specimen illustrated in FIG. 7 is placed at a speed of 10 mm per second, and basic data processing may be performed using special software. Here, the special software may also be used for performing signal processing and image processing by controlling the movement controller and the signal controller according to the present invention.

Referring to FIG. 8 and FIG. 9, it is confirmed that the scanning result is generated in consideration of the location at which a detection signal is detected, along with the detection signal detected from the multilayer specimen illustrated in FIG. 7.

Here, as shown in FIG. 9, based on the shape of the plate of the multilayer specimen, the scanning result imaged depending on the detection signal may be provided.

For example, as shown in FIG. 9, the part corresponding to the aluminum plate, in the multilayer specimen illustrated in FIG. 7, is imaged, whereby a user may show the letters 'XIS'.

Here, because the copper plate and the aluminum plate of the multilayer specimen illustrated in FIG. 7 have different magnetic properties, the scanning results shown in FIG. 8 and FIG. 9 may be generated.

According to the present invention, there is provided a scanning method through which a battery or a multilayer specimen having chemical functionality, which are difficult to analyze using a nondestructive analysis method using radioactivity, such as X-rays or the like, may be analyzed.

Also, the present invention may provide a scanning apparatus through which a multilayer specimen may be analyzed regardless of the size thereof.

Also, the present invention may provide a method for analyzing a multilayer specimen that is formed by bonding the same kind of pieces of metal using the same kind of material.

Also, the present invention may provide a method through which material may be analyzed without using an expensive electron microscope and without causing physical damage to the junction of a multilayered thin film structure.

Also, the present invention may provide a method through which a material may be scanned without using radiation or ultrasound and through which the scanning result may be imaged.

As described above, the apparatus and method for scanning a multilayer material using magnetism according to the present invention are not limitedly applied to the configurations and operations of the above-described embodiments, but all or some of the embodiments may be selectively combined and configured, so that the embodiments may be modified in various ways.

What is claimed is:

1. An apparatus for scanning a multilayer material using magnetism, comprising:
   at least one measurement head for exciting a mixed magnetic field on a multilayer specimen using at least one excitation solenoid coil and detecting detection signals from the multilayer specimen using a detection solenoid coil;
   a movement controller for moving any one of the at least one measurement head and a stage on which the multilayer specimen is placed in order to detect the detection signals for all parts of the multilayer specimen; and
   a signal controller for generating two excitation signals having different frequencies in order to generate the mixed magnetic field and for generating a scanning result for the multilayer specimen by collecting the detection signals,
   wherein the at least one measurement head excites the mixed magnetic field using a method in which the mixed magnetic field is directly generated using a single excitation solenoid coil when the at least one measurement head is configured with the single excitation solenoid coil, and
   wherein, when the at least one measurement head excites the mixed magnetic field using the method in which the mixed magnetic field is generated using the single excitation solenoid coil, the signal controller delivers a mixed signal, which is formed by adding the two excitation signals, to the at least one measurement head.

2. The apparatus of claim 1, wherein the at least one measurement head is configured with any one of a single-sided measurement head, which operates on one side of the multilayer specimen, and double-sided measurement heads, which operate on opposite sides of the multilayer specimen.

3. The apparatus of claim 2, wherein the at least one measurement head excites the mixed magnetic field using a method in which the mixed magnetic field is generated by mixing two magnetic fields respectively generated using two excitation solenoid coils when the at least one measurement head is configured with the two excitation solenoid coils.

4. The apparatus of claim 2, wherein the at least one measurement head is configured with the single-sided measurement head when the multilayer specimen has a size greater than a given size.

5. The apparatus of claim 1, wherein the movement controller comprises:
   a measurement head controller for moving the at least one measurement head to all coordinates of the multilayer specimen based on an X-axis and a Y-axis; and
   a stage controller for moving the stage such that a location of the at least one measurement head matches all coordinates of the multilayer specimen.

6. The apparatus of claim 1, wherein the signal controller comprises:
   a result generation unit for generating the scanning result based on a frequency range of the detection signal; and
   an image output unit for imaging and outputting the scanning result.

7. The apparatus of claim 1, wherein the two excitation signals correspond to a single high-frequency signal and a single low-frequency signal.

8. The apparatus of claim 7, wherein the mixed magnetic field is a combination of a first magnetic field generated by the high-frequency signal and a second magnetic field generated by the low-frequency signal.

9. The apparatus of claim 1, wherein each of the frequencies of the two excitation signals is in a range from 1 kHz to 100 kHz.

10. An apparatus for scanning a multilayer material using magnetism, comprising:
- a single-sided measurement head for exciting a mixed magnetic field on a multilayer specimen using a single excitation solenoid coil and detecting detection signals from the multilayer specimen using a detection solenoid coil, the single-sided measurement head operating on a single side of the multiplayer specimen;
- a movement controller for moving any one of the single-sided measurement head and a stage on which the multilayer specimen is placed in order to detect the detection signals for all parts of the multilayer specimen; and
- a signal controller for generating two excitation signals having different frequencies in order to generate the mixed magnetic field and for generating a scanning result for the multilayer specimen by collecting the detection signals,
- wherein the single-sided measurement head excites the mixed magnetic field using a method in which the mixed magnetic field is directly generated using the single excitation solenoid coil, and
- wherein the signal controller delivers a mixed signal, which is formed by adding the two excitation signals, to the single-sided measurement head.

* * * * *